Inventor
M. H. Shelton
by Wilkinson & Giusta
Attorneys

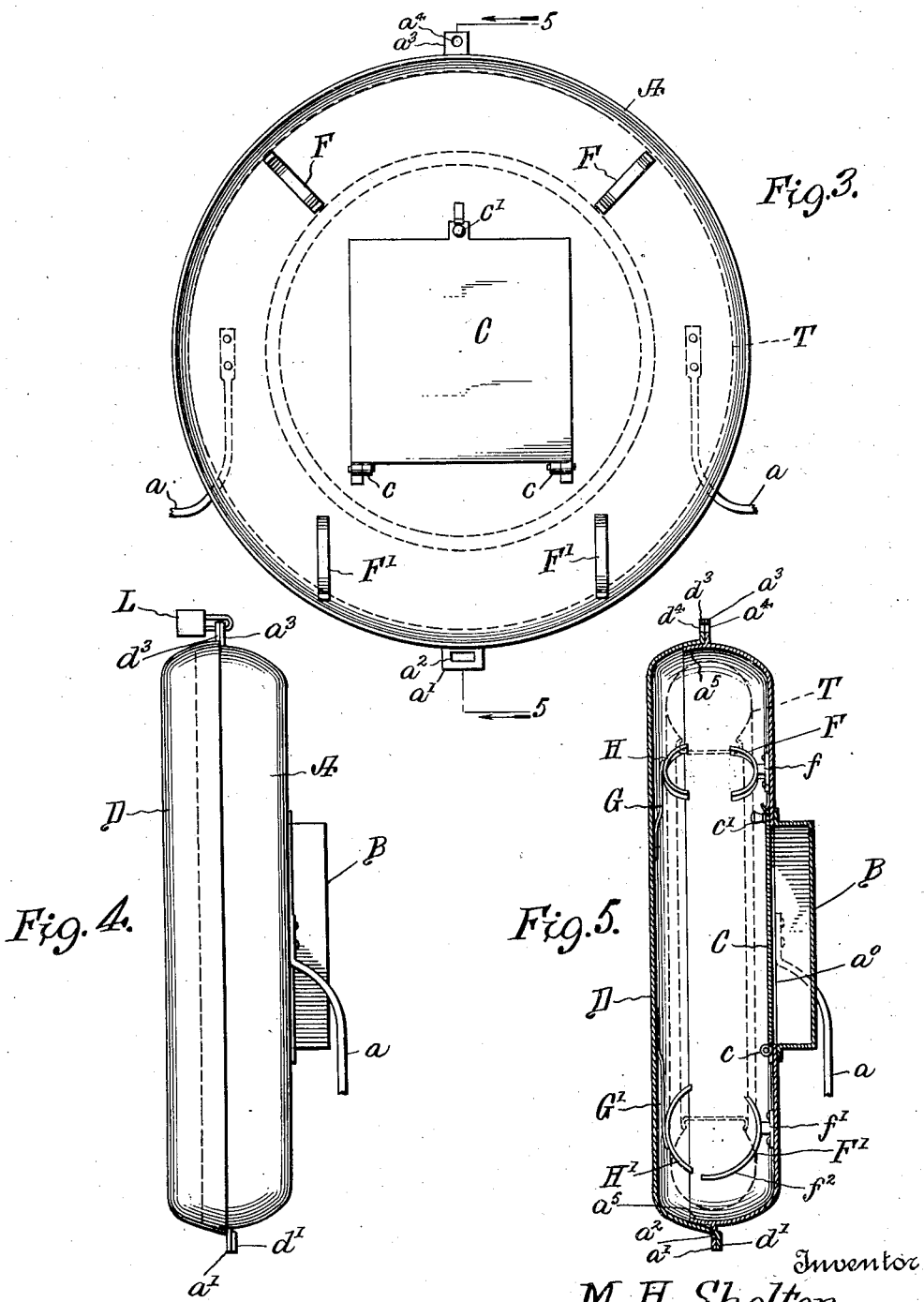

Patented June 4, 1929.

1,715,718

UNITED STATES PATENT OFFICE.

MARVIN HILL SHELTON, OF TAMPA, FLORIDA.

COMBINED TIRE COVER AND TOOL BOX.

Application filed December 19, 1927. Serial No. 241,130.

My invention relates to improvements in combined tire covers and tool boxes for use on automobiles.

It is well-known that the prolonged exposure of rubber tire casings to heat and sunlight is apt to produce chemical changes in the rubber which will cause the deterioration of the tire casing, shorten the life and impair the efficiency thereof, and for this reason it is desirable to cover up the spare tires carried by an automobile; and it is, of course, desirable to make such cover as sightly and as attractive as possible. It is also well-known that when it becomes necessary to change a tire or to remove the spare tire from its cover, certain tools are required; and these tools are most frequently located under one of the seats or in some inconvenient position. My invention consists in providing a combined tire casing and tool box so arranged as not to require any additional parts to the car, yet to have the tools conveniently accessible and the tire held in a neat and attractive container, which may be of an especially attractive appearance, and in which the spare tire may be securely locked against theft.

My invention will be more fully understood after reference to the accompanying drawings, in which like parts are indicated by similar reference symbols throughout the several views.

Figure 3 shows the front shell of the container carrying the tool box, the rear shell being removed therefrom.

Figure 4 shows the two shells of the container in the assembled position and locked, but the device is removed from the car, and Figure 5 shows a central vertical section through the device, showing the container closed, and with the spare tire indicated in dotted lines therein.

Figure 1:
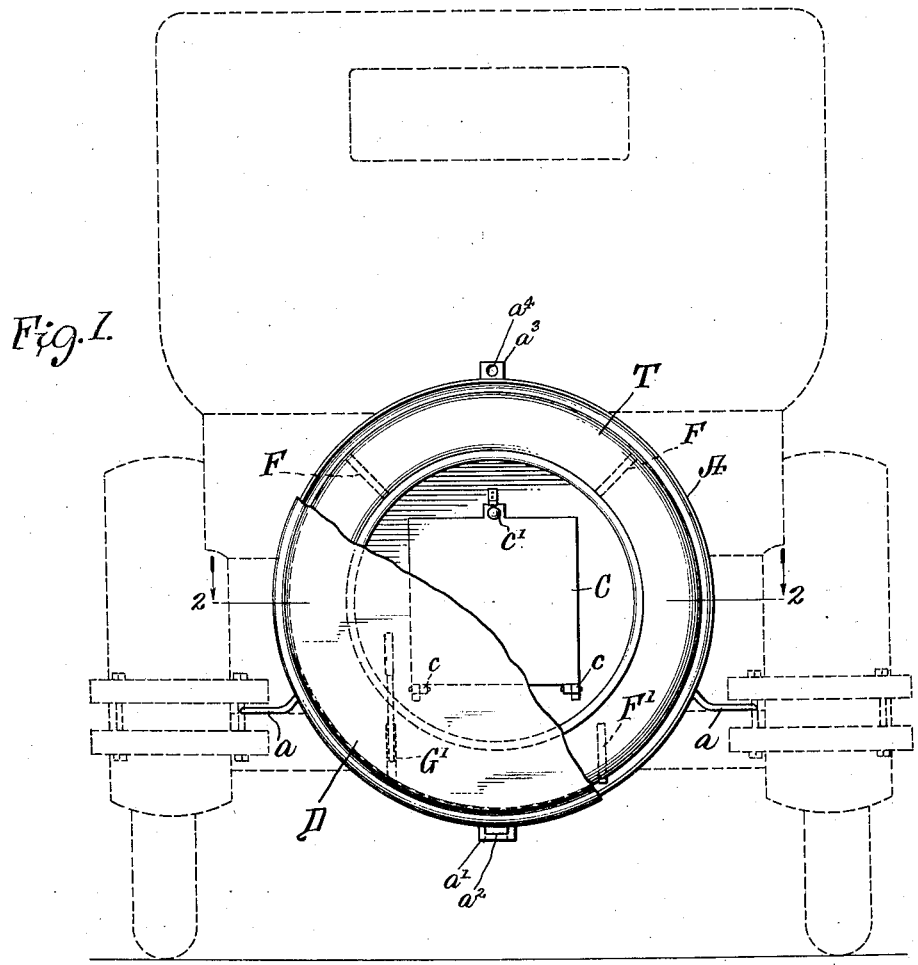
Figure 1 shows in dotted lines the rear elevation of a car, with my improvement attached thereto shown in full lines, parts of the same being broken away.
Figure 2:
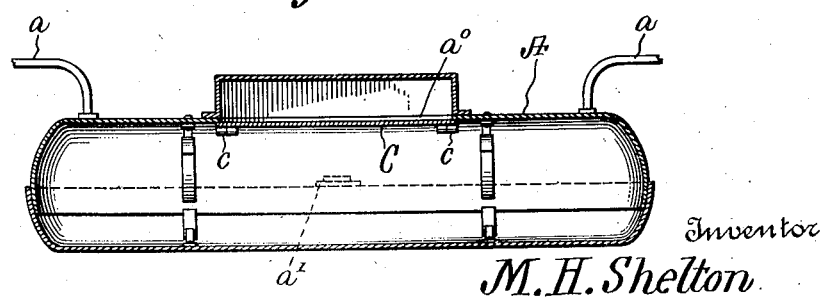
Figure 2 shows a section along the line 2—2 of Figure 1, and looking down.

A represents the front shell of the container which is connected to the body of the automobile in any convenient way as by the bent arms $a$. This shell is provided at its bottom with the lug $a'$ provided with an elongated slot $a^2$ as shown most clearly in Figure 3. At its upper end, the shell A is provided with a similar lug $a^3$ perforated as at $a^4$. The central portion of this shell is cut away as at $a^0$, see Figure 5, and this opening is closed by a door C preferably hinged at its bottom as at $c$ and provided with a catch $c'$ at the top; so that the door closes the opening in the shell. At the rear of this opening is the tool box B, which should be of sufficient size to accommodate such tools as may be ordinarily required in the management of an automobile.

While I have shown this tool box as rectangular in shape, it may be circular or of any other convenient shape preferred. It will be noted that the door C of the tool box lies wholly within the central opening of the tire mounted in the cover. This tire is indicated as at T in dotted lines of Figures 3 and 5.

The container is formed of the rear shell A and the front shell D, both of which are reversely dished as shown most clearly in Figure 5, and the part $a^5$ of the rear shell fits snugly in the corresponding portion of the front shell. The front shell D is provided with the tongue $d'$ adapted to pass through the slot $a^2$ in the lug $a'$ of the rear shell, and hold the two shells together at the bottom as shown in Figures 4 and 5. At its upper end, the shell D is provided with the lug $d^3$ being perforated as at $d^4$ to register with the perforation $a^4$ in the lug $a^3$ as shown at the top of Figure 5, and these two lugs $a^3$ and $d^3$ may be locked together in any way as by means of any suitable lock, such as L shown in Figure 4. The front shell A is provided with brackets $f$ and $f'$, which carry the clips F and F', which engage the front face of the tire when the tire is mounted in the container.

Each lower clip F' is provided with the long resilient arm $f^2$, which serves to support the tire in a yielding engagement. The front side of the tire when mounted in the container is held in place by the clips H and H', which are pressed normally inwards, respectively, by springs G and G', see Figure 5, and to which the tire is held securely in place in the container; and yet the yielding engagement provided by the clips will prevent the tire from rattling in the casing, or becoming cut by the clips. These clips may be faced with felt or other suitable material to further prevent marring the appearance of the tire.

In use the container is supposed to be empty and the rear shell to be removed. The tire is put in place to engage the clips F, and is supported on the resilient arms $f^2$ of the clips F'; and then the rear shell is put in place as by inserting the tongue $d'$ in the notch $a^2$, holding the shell in horizontal position, and then swinging the shell up to the vertical position shown in Figure 5. Now the hasp $l$ of the lock L may be passed through the holes $d^4$ and $a^4$ and the two shells locked together as shown in Figure 4. To disassemble the parts, reverse the operation.

It will be seen that the door C may always be opened or closed after the front shell is removed, whether the tire be mounted in the front shell or not.

The cupped engagement of the front and rear shells will serve to guide the rear shell into place when rung up to the vertical position, and will facilitate the removal of the rear shell when desired. It will be noted that the rear face of the rear shell as shown presents a smooth or rounded surface without any angles, and this may be made of burnished metal or painted and lacquered or ornamented in any desired way, while the front face of the front shell is masked against the rear portion of the automobile.

Thus I provide a neat, simple and efficient and ornamental automobile cover and tool box, which may be conveniently locked, and closed or opened when desired, and which will serve as an added feature to the attractions of the automobile.

While I have shown one embodiment of the invention in its preferred form, it will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. A combined tire cover and tool box adapted to be carried by automobiles comprising two reversely disposed dished annular metal shells, adapted to fit together to form a closed container to receive the tire, means for securing the front shell to the automobile, and means for detachably connecting the rear shell to the front shell, and for locking said shells together, the front shell being provided with a central opening therein, and a hinged door normally closing said opening, the front shell being also provided with a tool box projecting therefrom in front of said door, and resilient clips carried by said front and rear shells, respectively, for holding the tire in place in said container.

2. A tire cover adapted to be carried by automobiles comprising two reversely disposed dished annular metal shells, adapted to fit together to form a closed container to receive the tire, means for securing the front shell to the automobile, and means for detachably connecting the rear shell to the front shell, fixed to said front shell for engaging the tire when in said container, and spring impressed clips carried by the rear shell for engaging the rear face of the tire and co-operating with the first mentioned clips for holding the tire in place in said container.

MARVIN HILL SHELTON.